(12) United States Patent
Wendt et al.

(10) Patent No.: US 11,003,152 B2
(45) Date of Patent: May 11, 2021

(54) BUILDING AUTOMATION SYSTEM WITH SERVICING BEACON

(71) Applicant: SIGNIFY HOLDING B.V., Eindhoven (NL)

(72) Inventors: Matthias Wendt, Würselen (DE); Peter Deixler, Arlington, MA (US); Harald Josef Günther Radermacher, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 78 days.

(21) Appl. No.: 16/336,002

(22) PCT Filed: Sep. 20, 2017

(86) PCT No.: PCT/EP2017/073779
§ 371 (c)(1),
(2) Date: Mar. 22, 2019

(87) PCT Pub. No.: WO2018/054976
PCT Pub. Date: Mar. 29, 2018

(65) Prior Publication Data
US 2020/0026251 A1 Jan. 23, 2020

(30) Foreign Application Priority Data
Sep. 23, 2016 (EP) .................................. 16190365

(51) Int. Cl.
*G05B 19/042* (2006.01)
*G05B 15/02* (2006.01)

(52) U.S. Cl.
CPC .......... *G05B 19/042* (2013.01); *G05B 15/02* (2013.01); *G05B 2219/25011* (2013.01); *G05B 2219/2642* (2013.01)

(58) Field of Classification Search
CPC .............. G05B 15/02; G05B 19/042; G05B 2219/25011; G05B 2219/2642
See application file for complete search history.

(56) References Cited

U.S. PATENT DOCUMENTS

| | | | | | |
|---|---|---|---|---|---|
| 5,333,273 | A | * | 7/1994 | Raasch | ................. G06F 3/0489 708/139 |
| 7,382,271 | B2 | * | 6/2008 | McFarland | ............ G05B 15/02 340/686.6 |

(Continued)

FOREIGN PATENT DOCUMENTS

| WO | 2007003038 A1 | 1/2007 |
|---|---|---|
| WO | 2007066166 A1 | 6/2007 |
| WO | 2008025878 A1 | 3/2008 |

*Primary Examiner* — Chun Cao
(74) *Attorney, Agent, or Firm* — Meenakshy Chakravorty

(57) ABSTRACT

An electronic building automation system, comprising:
(I) one or more electronic building automation devices, comprising
  a processor circuit configured to
    monitor the building automation device,
    determine a need for servicing of the building automation device, and
(II) a servicing device for locating a building automation device in need of servicing,
wherein one of a building automation device and the servicing device comprises:
  a servicing beacon, the servicing beacon is arranged to transmit a localizing beacon signal,
and wherein the other of the building automation device and the servicing device comprises:
  a beacon receiver arranged to receive a localizing beacon signal transmitted from a servicing beacon, the building automation device and servicing device being arranged for the building automation device to be locatable when in need of servicing.

13 Claims, 10 Drawing Sheets

(56) References Cited

U.S. PATENT DOCUMENTS

| | | | |
|---|---|---|---|
| 2005/0049754 A1* | 3/2005 | Ogawa | G05B 15/02 |
| | | | 700/275 |
| 2006/0074494 A1 | 4/2006 | McFarland | |
| 2015/0327010 A1 | 11/2015 | Gottschalk et al. | |
| 2018/0139063 A1* | 5/2018 | Yseboodt | H04L 12/10 |
| 2018/0373304 A1* | 12/2018 | Davis | H01H 9/56 |
| 2020/0196093 A1* | 6/2020 | Wendt | G01S 1/024 |

* cited by examiner

BUILDING AUTOMATION SYSTEM WITH SERVICING BEACON

CROSS-REFERENCE TO PRIOR APPLICATIONS

This application is the U.S. National Phase application under 35 U.S.C. § 371 of International Application No. PCT/EP2017/073779, filed on Sep. 20, 2017, which claims the benefit of European Patent Application No. 16190365.3, filed on Sep. 23, 2016. These applications are hereby incorporated by reference herein.

FIELD OF THE INVENTION

The invention relates to an electronic building automation system, a servicing device, an electronic method for a building automation device, a method for a servicing device, and a computer readable medium.

BACKGROUND

In modern lighting systems the number of devices is growing. This is because of the wish for fine grained lighting but also because LED based lamps can be made efficient even in ever smaller form factors and small lumen packets. At the same time, the reliability of LED installations is increasing. Because of this, servicing of such installations is hard: In modern buildings there will be many lamps that rarely fail. For this reason, it is unattractive to service such lighting systems by hand. Service personnel would have to verify numerous lamps to find relatively few failures.

With an increasing number of smaller lamps just locating a failed device becomes hard. Due to reorganizations, the room organization present when a network was implemented need not be the same as the present organization. In fact, modern buildings are often optimized for easy reorganizations, e.g., changing offices into open plans, or vice versa. Lighting plans may simply be incorrect.

Even the network used in a connected lighting system does not always give accurate clues as to the location of a lighting asset. Even if the lighting system is wired, e.g., using power over Ethernet technology, the routing of the network does not always give a good indication of the light network asset's location. Two elements that are close in the network, need not be close in physical distance. Even if two lamps are connected to the same switch, they do not need to be near to each other. The latter happens in practice because switches are relatively expensive elements in a connected lighting system, so that they tend to be used to capacity.

The inventors have found that in practice finding failed devices is a problem that needs to be addressed. The same problem occurs not only in connected lighting systems, but more generally in the field of building automation. In building automation, multiple devices are connected through a digital network to a control computer. The control computer manages the building automation system. Building automation includes heat, ventilation, air conditioning (HVAC), lighting, security, etc.

SUMMARY OF THE INVENTION

To address these and other problems an electronic building automation system is provided. The building automation system comprises one or more electronic building automation devices and a servicing device which are arranged so that a building automation device can be located using the servicing device when the building automation device requires servicing. In an embodiment, the building automation device comprises a processor circuit configured to monitor the building automation device, and to determine a need for servicing of the building automation device. The servicing device is configured for locating a building automation device in need of servicing. The inventors found that beacon technology which ordinarily is used to set up localization systems in which localization is determined by estimating the distance to multiple beacons may be used to find building automation devices that need service.

Interestingly, one of a building automation device and the mobile servicing device comprises a servicing beacon that is arranged to transmit a localizing beacon signal, and wherein the other of the building automation device and the mobile servicing device comprises a beacon receiver arranged to receive a localizing beacon signal transmitted from a servicing beacon.

The device with the beacon receiver can determine when the other device is near, thus the building automation device and servicing device are arranged for the building automation device to be locatable when in need of servicing.

A method according to the invention may be implemented on a processor circuit as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Software that implements a method according to an embodiment may also be downloaded from an online software repository, for example, an app-store such as Google play. In particular, a method for a servicing device is suitable for downloading, e.g., to a mobile phone.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a building automation system, FIG. 1b schematically shows an example of an embodiment of a building automation system, FIG. 1c schematically shows an example of an embodiment of a monitoring unit, FIG. 1d schematically shows an example of an embodiment of a building automation system, FIG. 1e schematically shows an example of an embodiment of a building automation system, FIG. 1f schematically shows an example of an embodiment of a building automation system, FIG. 2 schematically shows an example of an embodiment of an office light plan FIG. 3a schematically shows an example of an embodiment of a building automation system, FIG. 3b schematically shows an example of an embodiment of a building automation system, FIG. 3c schematically shows an example of an embodiment of a building automation system, FIG. 4 schematically shows an example of a display of a mobile servicing device, FIG. 5 schematically shows an example of an embodiment of a luminaire and LED, FIG. 6 schematically shows an example of an embodiment of a building automation method 300 for a building automation device, FIG. 7a schematically shows a computer readable medium having a writable part comprising a computer program according to an embodiment, FIG. 7b schematically shows a representation of a processor system according to an embodiment.

LIST OF REFERENCE NUMERALS IN FIGS. 1A-1D AND 5

Figure 1A:
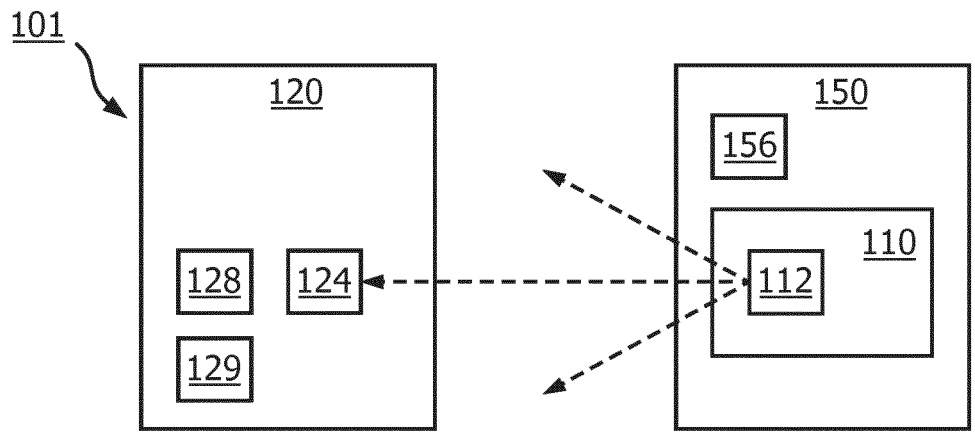

101-103 a building automation system
110 a servicing beacon
112 a radio circuit
120 an electronic building automation device
121 a current measuring unit
122 a communication interface
123 a voltage measuring unit
124 a beacon receiver
125 a counter
128 a processor circuit
129 a monitoring unit
130 a control computer
132 a communication interface
134 a processor circuit
150 a Mobile servicing device
152 a communication interface
156 a processor circuit
500 a luminaire
510 a powered device circuit (PD)
511 a Power over Ethernet connection
520 a memory
530 a processor circuit
531 control connection
540 a driver
545 a measurement unit
546 a beacon receiver
550 a LED

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 2:
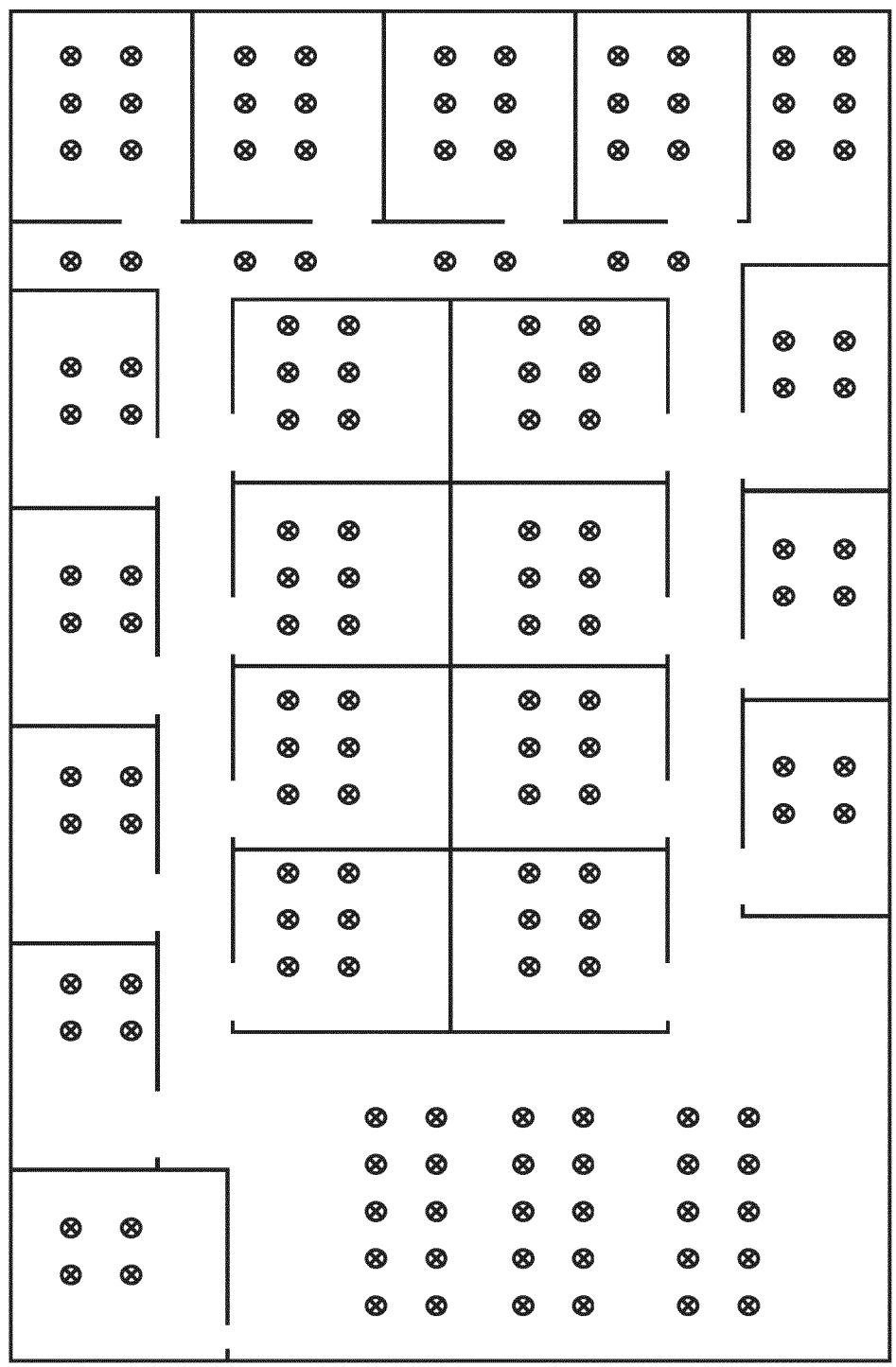

FIG. 2 shows an office light plan. On this schematic example map for a floor of an office building floor a large number of luminaires are shown. Any one of these luminaires can fail for a variety of reasons. Even if it were known that a luminaire where broken, e.g., because the luminaire sent a message to some central computer, which might e.g. be done if the lighting system were a connected lighting system, there is still the task of finding the luminaire. Unfortunately, this is an awkward problem in practice. FIG. 2 does not show the wiring, but this may be complicated and hard to access. Identification codes of the luminaire may be arbitrary and not have a clear relationship with the location of the luminaire. Even network identification codes such an IP addresses and the like, are not a reliable indication of the location of a building automation device. Finally, the office plan may simply be wrong, e.g. because the office layout changed, perhaps multiple times. There is thus a need to find a building automation device that needs servicing.

The inventors realized that this problem can be solved using, inter alia, a servicing beacon and a beacon receiver. The beacon transmitter and receiver can be in the servicing device and the building automation device, respectively, or vice versa. These two embodiments are detailed in FIGS. 1a and 1b and are described below.

FIG. 1a schematically shows an example of an embodiment of an electronic building automation system 101. System 101 comprises multiple electronic building automation devices. Only one building automation device 120 is shown. FIG. 1a also shows a servicing device 150, sometimes also referred to as a servicing tool. The building automation device 120 and the servicing device 150 are arranged for the building automation device to be locatable when in need of servicing. For example, building automation device 120 may comprise an LED that may fail or become faint, etc., requiring service to the building automation device 120.

Servicing device 150 comprises a beacon 110. Radio circuit 112 is arranged to transmit a wireless localizing beacon signal. The wireless localizing beacon signal comprises a servicing device identifier indicating the beacon as a servicing device beacon. The servicing device identifier may be the same for all servicing devices, but may also identity the particular servicing device. For example, the servicing device identifier may be stored in a beacon memory. Beacon 110 is arranged to periodically repeat the localization signal. Beacon 110 or servicing device 150 may comprise a processor circuit configured to generate the localization signal and to periodically repeat transmission of the localization signal over radio circuit 112. Radio circuit 112 may comprise an antenna.

The localizing beacon signal may comprise further information, for example, an identifier of the type of servicing device 150. If the type of servicing device 150 is not correct, e.g., a servicing device for HVAC whereas a servicing device for luminaires is needed, the signal may be ignored.

Servicing device 150 may be carried by servicing personnel as they make their rounds through a building. For example, a yearly maintenance or the like may be scheduled during which the servicing personnel goes through the building carrying the servicing device 150. Servicing device 150 may be a mobile device. For example, the device 150 may be embodied in a mobile phone, e.g., downloaded thereon in the form of an app. Beacon 110 transmits while servicing device 150 is carried around the building so that building automation devices are notified when servicing personnel is near.

Beacons, such as beacon 110, are primarily known for their use in localization systems. A beacon based localization system allows a device with a beacon receiver, e.g., a mobile phone etc., to obtain its position on a small scale.

Beacons may be based on different types of wireless technology. For example, beacons 110 may be a Bluetooth, Zig-Bee, or Wi-Fi beacon. In an embodiment, beacon 110 uses Bluetooth Low Energy (BLE). Other possible beacon types include WiFi, WiMax, or LoRa (e.g. for street lighting). The received beacons may be a mixture of different type beacons. In a localization system, often beacons are installed in a grid to give good location coverage over the whole space.

In an embodiment, a localization signal comprises a constant preamble followed by the beacon identifier. The beacon identifier may be a UUID (Universally Unique Identifier), and a Major and Minor value. For example, the UUID may be 16 bytes long, Major and Minor are each 2 bytes long. Together these form an ID for the beacon. In an embodiment, the UUID is the same for all beacons in the same localization system, while the Major and Minor values vary for each beacon. A localization signal may further comprise a signal power value. For example, it may represent the RSSI value (Received Signal Strength Indication) measured at 1 meter from the beacon. The value of this value may be used in calculating a location from received signal strengths. The signal power value of the beacon may be known at the control computer. For example, the control computer may comprise a table associating beacon identifier to signal power value. The signal power value may be the same for all beacons in localization network.

For example, any one of the UUID, Major and/or Minor number may be a special value, the servicing device identifier, e.g., a magic number that indicates that beacon 110 in FIG. 1a is servicing device. For example, the UUID may be or comprise the servicing device identifier. This may also signal to other devices who rely on beacon signals for localization not to use a beacon signal with the servicing device identifier.

The range of the localization signal of a beacon depends on the transmission power of the beacon. This may be the same for all beacons, or may be set differently for some beacons. Note that reception of a beacon localization signal depends on environmental factors. The localization signal is repeated each time period. For example, a repeat interval may be set between, e.g., 100 ms and 1 second, e.g., 200 ms. For example, in an embodiment, beacon receiver 124 is not powered, when there is no need for servicing. For example, receiver 124 may be turned on when a need for servicing is determined.

Building automation device 120 comprises a beacon receiver 124 arranged to receive localizing beacon signals transmitted from beacon 110 if it is within range. Optionally, building automation device 120 may compute the approximate distance to the beacon 110 from a RSSI obtained by receiver 124 and the RSSI at 1 meter in the beacon signal. For example, building automation device 120 may be configured to ignore a servicing device that is too far away, e.g., if the approximate distance is over a threshold.

In an embodiment, device 120 does not receive or process the localization signals continuously, e.g., to reduce power use, or bandwidth, or to reduce complexity. For example, device 120 may be configured to only receive and/or process beacon signals if it has a need for servicing, as described below.

Estimates of the distance to a beacon can be made by recording the received signal strength of the localization signal. In an embodiment, beacon receiver 124 is arranged to measure the signal strength of the localization signal (e.g., a Received Signal Strength Indicator, RSSI). The signal strength indication indicates the signal strength with which the localization signal was received at beacon receiver 124. Optionally, processor circuit 128 is arranged to also obtain a signal power value received in the localization signal. The signal power value and the received signal strength may be used by processor circuit 128 with the signal strength indication in estimating a distance between the beacon receiver 124 and the beacon 110. If the signal power value is constant, then obtaining this value from the localization signal may be omitted.

In an embodiment, the estimated distance may be rounded to a few categories, e.g., unknown, immediate below 50 cm, near up to 2 m and far up to 30 m. In an embodiment, processor circuit 128 is configured to ignore servicing localization signals that are too weak, e.g., by estimating the distance to the servicing device and to ignore the signal if the servicing device is further away than a threshold, e.g., further away than 25 meters.

In an embodiment, building automation device 120 is a luminaire. In an embodiment, building automation device 120 is any one of the following group: a heating device, a ventilation device, an air conditioning device, a speaker, an automated air valve, a fire detector, a sensor, a wall switch. For example, the control computer may be the back-end of a building automation system (BAS) or building management system (BMS).

Processor circuit 128 is configured to monitor building automation device 120 and determine a need for servicing of the building automation device. In an embodiment, device 120 comprises a monitoring unit 129. There are multiple ways in which a processor may monitor a device. A number of different examples are shown in FIG. 1c, and discussed below. Other ways to monitor a device known in the art may also be applied.

FIG. 1c shows three ways to monitor a building automation device. Each of these is optional, and any two may be combined.

In an embodiment, monitoring unit 129 comprises a current measuring unit 121. Current measuring unit 121 is arranged to determine electric current flowing through a component of the building automation device. For example, the current flowing through a LED. Processor 128 of the building automation device 120 is configured to determine a need for servicing when the building automation device is in an on-state and current measured by the current measuring unit is below a threshold. In particular, if no current flows, the LED or the driving circuitry is likely broken.

In an embodiment, building automation device 120 comprises a voltage measuring unit 123 arranged to determine electric voltage across a component of the building automation device. For example, the voltage across a LED. Processor 128 of the building automation device 120 is configured to determine a need for servicing when the building automation device is in an on-state and a voltage measured by the voltage measuring unit is above a threshold. When no voltage differential exists on a LED, even though it should be giving light, it is likely broken.

The voltage and current measurement may be done over other components than LEDs. For example, over a motor in an air-conditioning device, etc.

In an embodiment, building automation device 120 comprises a counter 125. Processor 128 of the building automation device 120 is configured to increase the counter in dependence on the use of the building automation device, and determine a need for servicing when the counter reaches a threshold. For example, each time the building automation device 120 is turned on, the counter may be increased. For example, for each time period, say each 5 minutes, that building automation device 120 is turned on, the counter may be increased. For example, processor 128 may be configured to obtain an intensity of use of the building automation device, say a dimming level in case of a luminaire, and increase the counter in dependence on the intensity of use of the building automation device. Processor 128 is configured to determine a need for servicing when the counter reaches a threshold. For example, the counter may be set to an initial value upon manufacture; the initial value may be 0.

In another embodiment, the building automation device may also detect a corrupt firmware image, e.g., through a failing checksum, or the need for a firmware upgrade, e.g., if the previous update is too old. In some embodiment, updating of the firmware is not possible over the lighting control network but requires uploading at the location of the building automation device.

In an embodiment, a building automation device comprises none, or one, or multiple of current measuring device 121, voltage measuring device 123 and counter 125.

Returning to FIG. 1a. Once processor 128 determined that there is a need for servicing, for example, because a component is broken or because the performance of a component appears to be reducing, the building automation device becomes receptive to the localizing beacon signal from a servicing device beacon. For example, the localizing signal may comprise a servicing device identifier indicating the beacon as a servicing device beacon.

For example, once a need for servicing is detected, a flag may be set, or a mode may be entered that signal a need for servicing. When building automation device 120 has a need for servicing mode, it periodically checks for localization signals from beacons. If such a signal is received, processor circuit 128 verifies if the localization signal originated from a servicing device 150, e.g., by verifying the identifier.

If a received localizing beacon signal is determined to originate from a servicing device and there is a need for servicing, e.g., as determined by monitoring unit 129, e.g., as indicated by a servicing flag, or mode, etc., then processor 128 activates a visual or audible signal.

The visible or audible signal may be given by an alarm unit comprised in building automation device 120 (not separately shown in FIG. 1a), but the signal may also be given by existing elements. For example, a luminaire may use a lighting source in the luminaire to provide the signal. For example, the light may change according to a pattern, e.g., change intensity, flicker on or off, change color etc. If the building automation device has a capacity for sound, e.g., a fire alarm, a sound signal may be given. In an embodiment, the building automation device comprises an alarm unit arranged to provide the audible and/or visible signal. For example, the alarm unit may comprise a light and/or a speaker, or beeper etc.

In modern lighting systems the number of devices is growing. This is because of the wish for fine grained lighting but also as LED based lamps can be made efficient even in small form factors and small lumen packets. In some cases, multiple radios may be present in the same luminaire. For example, one luminaire equipped with four Smart LED lamps having each a wireless radio. As wirelessly connected luminaires are not connected to a cable, they can be harder to find.

On the other hand, even in wired lighting systems, e.g. in embodiments in which luminaires are connected to a computer network through cables such as Ethernet cabling, finding a luminaire with a problem may be hard. The cabling may run behind a suspended ceiling, leading to a problem of finding the correct device. Moreover, the cabling need not follow the partition of the floor in different rooms, especially not after one or more reorganizations.

In an embodiment, the luminaires may be provided with electric power along with data through the same Ethernet cable, e.g., using Power over Ethernet or PoE. Even in this case, assets may be hard to physically locate. Also in Power over Ethernet lighting systems and the like the power sourcing equipment (PSE) may be located behind the suspended ceiling, leading to a problem of finding the correct device.

There is thus a growing issue of directing service personnel to the right spot when devices need maintenance, repair or exchange. The LEDs may be so-called TLEDs.

Figure 3A:
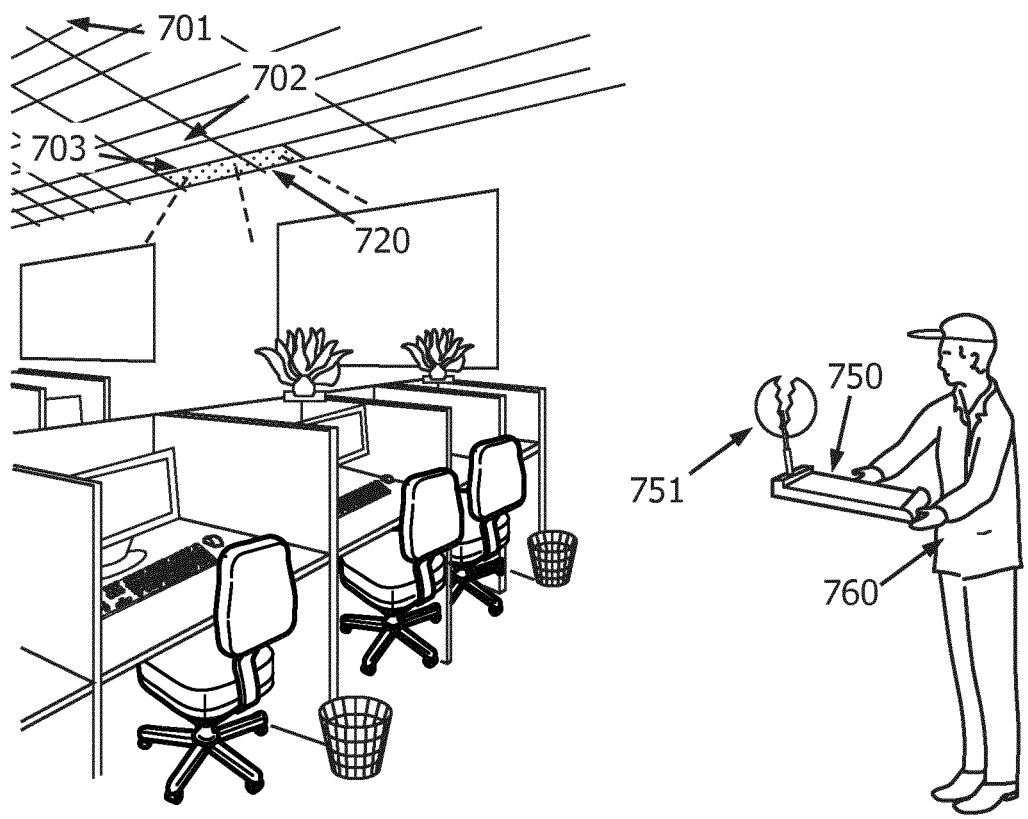

FIG. 3a shows an exemplary embodiment. Shown is an office environment with a lighting network installed in the ceiling. Shown are luminaires 701, 702 and 703. The latter is currently in need of service. Also shown is a service person 760 holding a mobile servicing device 750. Servicing device 750 comprises an antenna 751. Antenna 751 is currently in use as beacon and sends a servicing localization signal. Luminaire 703 receives this signal and recognizes it as coming from a servicing device. As a result, luminaire 703 gives a visible signal. In this case by changing its color. Other options are to flicker, or change intensity, e.g., in a pattern and the like.

Figure 1B:
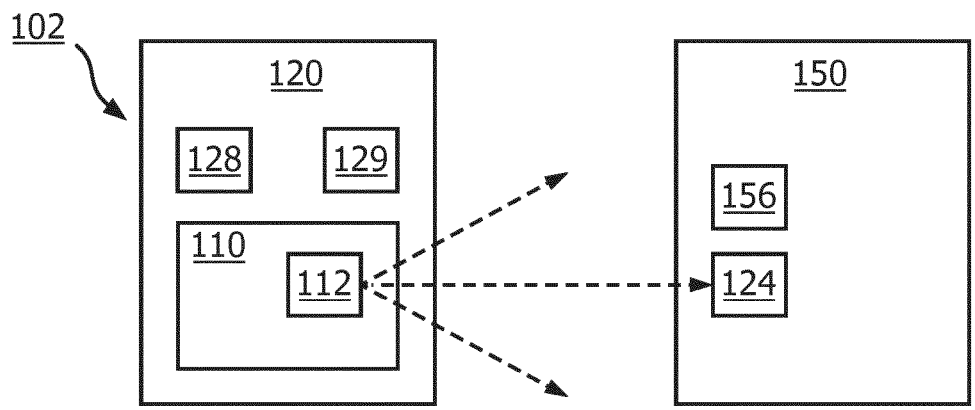
Figure 1C:
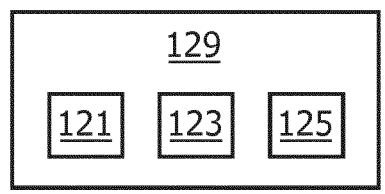

FIG. 1b schematically shows an example of an embodiment of a building automation system 102. System 102 is very similar to system 101 except for the location of the beacon and beacon receiver. Furthermore, the building automation device 120 in FIG. 1b is not configured to give a visual or audible signal.

In the embodiment according to FIG. 1b, building automation device 120 comprises the servicing beacon 110. If the servicing beacon 110 is part of a building automation device, as is the case in this embodiment, the servicing beacon may also be referred to as a service request beacon 110, instead of the servicing device 150. The service request beacon 110 is selectively activatable by processor circuit 128.

For example, the beacon 110 may be turned on by processor circuit 128, so that beacon 110 starts transmitting a servicing localization signal. For example, beacon 110 may be switched by processor circuit 128 from service as a normal localization beacon, e.g., as part of a localization beacon network, to a servicing beacon, e.g., by changing the ID in the localization signal. If processor circuit 128 determines a need for servicing, then beacon 110 is activated.

The servicing localization signal may comprise further information, for example, the type of servicing that is needed, an ID of the building automation device, etc. For example, an ID of the building automation device may allow the building automation device to be shown on a map, e.g., a light plan.

When beacon 110 is operative as servicing beacon, the localizing beacon signal comprising a servicing request identifier indicating the beacon as a building automation device in need of servicing.

For example, servicing beacon 110 in building automation device 120 is configured with a first mode in which the servicing beacon transmits a first localizing beacon signal. The first localizing beacon signal does not comprise the servicing request identifier. In the first mode, the servicing beacon is part of a localization beacon network. For example, the beacon may be used by mobile phones, etc., to compute their position in the building.

The building automation device has a second mode in which the servicing beacon transmits a second localizing beacon signal, the second localizing beacon signal comprising the servicing request identifier indicating the beacon as a building automation device in need of servicing. For examples, modes may be indicated by flag, or register etc. Processor circuit 128 may be configured to switch the service request beacon from the first mode to the second mode if the building automation device determined a need for servicing. The mode may be reset after the device has been serviced, e.g., automatically, e.g., because the need for servicing is no longer present, or manually, e.g., by the servicing person.

Servicing device 150 comprises beacon receiver 124 and a processor circuit 156. For example, servicing device 150 may receive localization signal on the beacon receiver and determine if a received signal is a servicing request signal. Servicing device 150 is configured to obtain the servicing request identifier from the received localizing beacon signal to determine that the localizing beacon signal originated from a building automation device in need of servicing. If the servicing device determined that some building automation device needs servicing, it generates a signal indicating the presence of a building automation device in need of servicing. In an embodiment, processor circuit 156 is configured to estimate the distance to the building automation device 120 from the received signal strength, and to include the distance in the signal.

There are a number of ways in which servicing device 150 may give the signal. For example, in an embodiment the signal may be a visual signal displayed on a display of servicing device 150. For example, servicing device may be configured to estimate the distance to building automation device 120 from the received localization signal. This embodiment is especially advantageous when servicing device 150 is mobile. For example, the servicing device may be a mobile phone, e.g., with a suitable app installed thereon. For example, servicing personnel may use servicing device 150 and the localization signal to localize the building automation device that needs servicing.

Figure 3B:
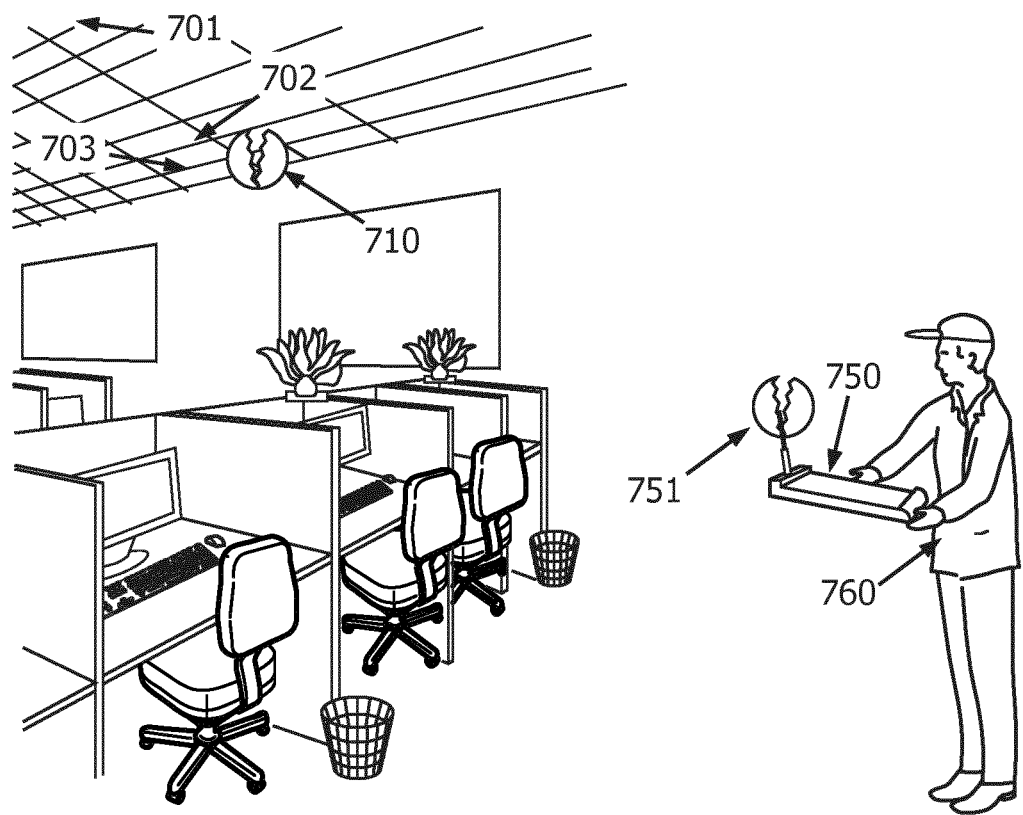

FIG. 3b shows an exemplary embodiment. Shown is an office environment with a lighting network installed in the ceiling. Shown are luminaires 701, 702 and 703. The latter is currently in need of service. The luminaires comprise a beacon. The beacon of luminaire 703 is currently sending a servicing requesting localization signal. Also shown is a service person 760 holding a mobile servicing device 750. Servicing device 750 comprises an antenna 751.

Antenna 751 is currently in use to receive localization signals, in particular the signal sent from luminaire 703. Servicing device 750 signals this on a display of servicing device 750. Person 760 may use servicing device 150 to locate luminaire 703.

If multiple beacon signals are received at servicing device 750, it may display multiple signals, or it may only show the closest one, etc.

Figure 1D:
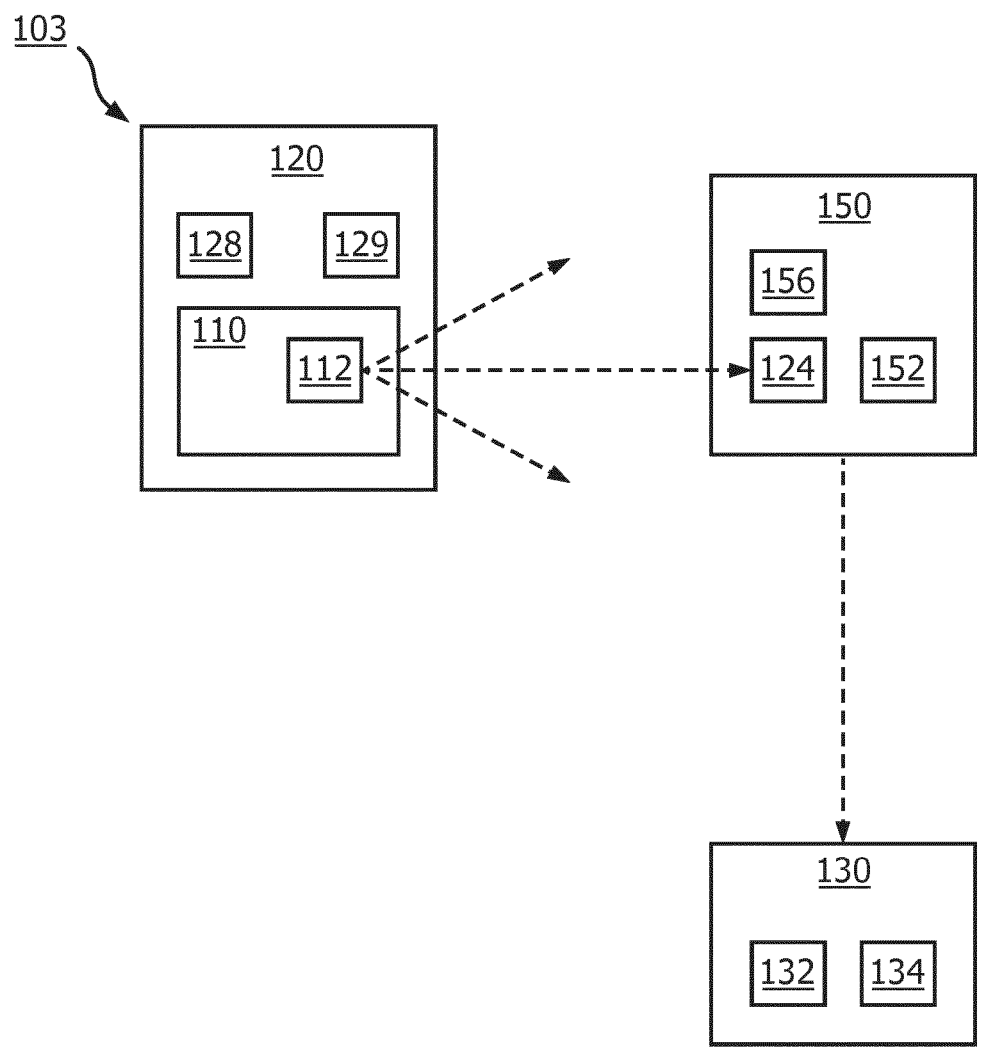

FIG. 1d shows a further variant of generating the signal. The lighting system 103 of FIG. 1d is similar to lighting system 102 of FIG. 1b.

Shown in FIG. 1d is a servicing device 130 that comprises a communication interface 122 arranged to communicate with an external control computer 130 over a digital network. Processor circuit 156 is arranged to send a servicing request message to external computer 130 if it has determined a building automation device in need of servicing. The distance to building automation device 120, or even its localization signal itself can be included in the servicing request message to the external computer.

This embodiment has the advantage that the building automation devices need not be connected, but only have a beacon 110. A single servicing device 130 in the vicinity of the building automation devices can forward the servicing request. In this embodiment, the servicing device may be stationary device, e.g., installed in a floor of a building. The servicing device may also be installed in a movable apparatus, such as a shopping cart or a cleaning robot. As the movable apparatus is moved through the building, it will end up in the vicinity of the building automation device and pick up the servicing requests their beacons may sent out.

Figure 3C:
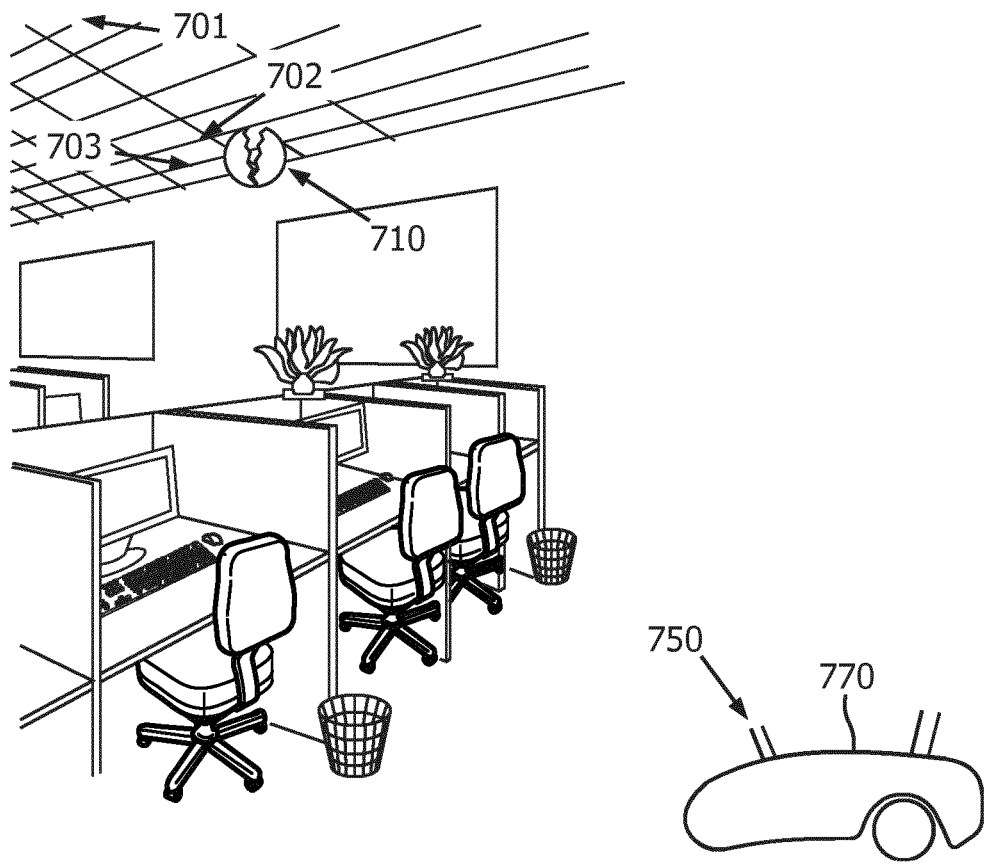

FIG. 3c shows an exemplary embodiment, which is similar to FIG. 3b. The servicing device 750 is installed in a cleaning robot 770. As cleaning robot 770 moves around the office, it will come into the vicinity of luminaire 703 and will receive its signal. Robot 770 can then forward the signal to a computer 130. Computer 130 can in turn signal service personnel, e.g., by email, etc.

Figure 1E:
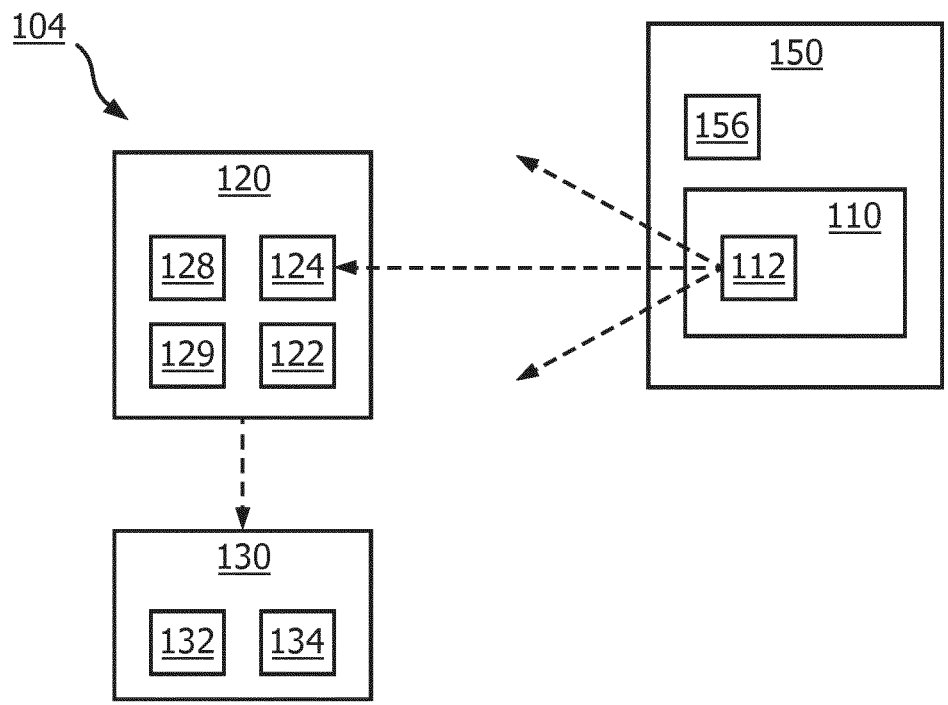

FIG. 1e schematically shows an example of an embodiment of a building automation system 104. Building automation system 104 is similar to building automation system 101. In this embodiment, building automation device comprises a communication interface 122 arranged to communicate with an external control computer 130 over a digital network. Processor circuit 128 is configured to send a service request to the control computer 130 if the building automation device determined a need for servicing. The service request may comprise an identifier of the building automation device 120, e.g., a name, a computer network address. This may however be insufficient to fully locate the building automation device. The identifier may be stored in a memory of building automation device 120. The service request may also comprise other information such as the nature of the failure. Sending the service request may be done as a digital message over a computer network.

After computer 130 receives the request, e.g., using an interface 132, service personnel may be dispatched to the approximate location of the building automation device that sent the request. For example, processor 134 may be configured to send a digital message, such as an email, sms or the like to summon someone to the right location. However, a precise location of the building automation device that sent the message may be difficult.

After sending the service request, the building automation device may be responsive to the servicing beacons in servicing devices. When the servicing devices comes near the building automation device gives an audible or visible signal. In this way, before climbing the ladder, the received beacon identifiers can be verified using the mobile servicing device.

In an embodiment, lighting assets (or other building automation device, e.g., such as connected infrastructure devices like speakers, air valves, fire detectors etc.) are able to receive localization beacons from a localizing beacon network (not shown). These building automation devices register the beacons and when needing service, they transmit the registered beacon identifiers to a central computer, e.g. to the central lighting or (building) management system. The information about all receivable beacons and the relative RF amplitude gives a good indication of the position of that very asset. A service call may contain the related beacon identifiers and allow the service personnel to find their way to the related lighting device.

Thus, in such an embodiment a building automation device can summon servicing personnel when needed. When service personnel is in the neighborhood of such a building automation device, it can detect the service beacon of the servicing device and attract the attention of the servicing personnel.

Figure 1F:
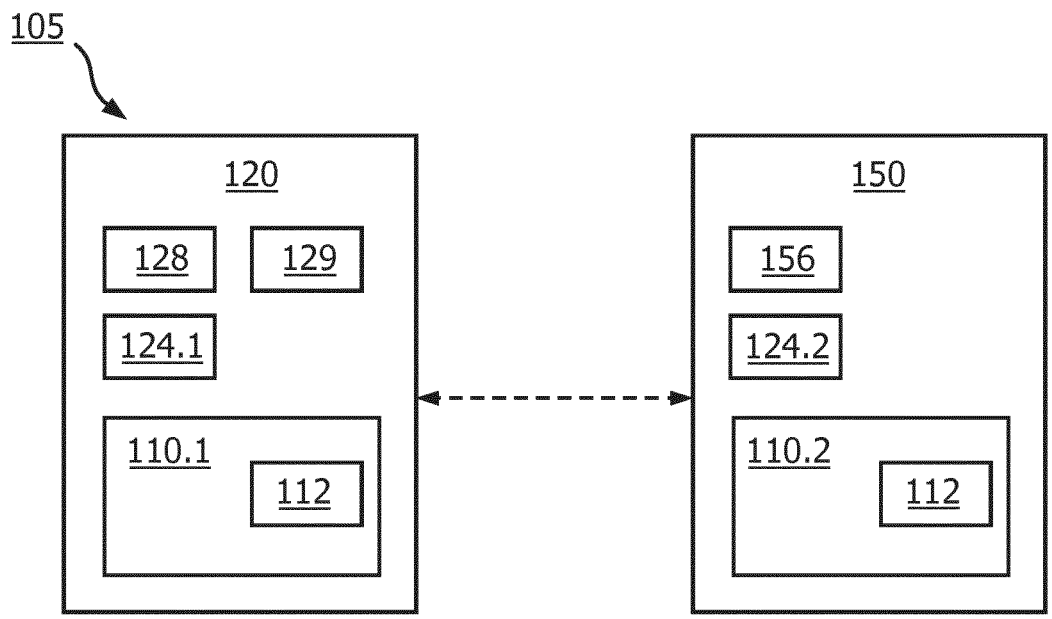

FIG. 1f schematically shows an example of an embodiment of a building automation system 105. In this embodiment, the building automation device has both a beacon receiver 124.1 and a beacon 110.1. The servicing device has both a beacon receiver 124.2 and a beacon 110.2. When there a need for servicing is determined the building automation device 120 starts transmitting service requesting localizing beacon message with beacon 110.1. This signal helps to guide servicing device 150 to the correct location. Building automation device 150 also starts to receive beacon messages and can signal the reception of servicing device 150's signal through audible and/or visible means. In this way locating the correct the device is further optimized.

Figure 4:
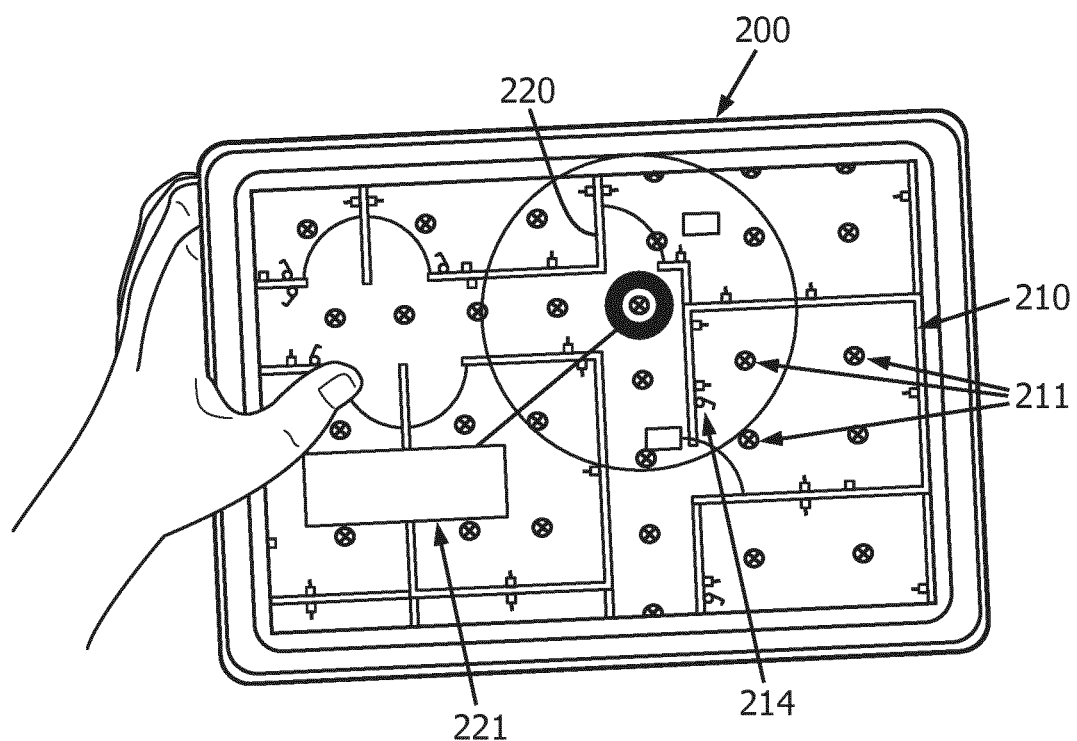

FIG. 4 schematically shows an example of an embodiment of a mobile servicing device 200. The display shows part of a lighting plan of the office. It is assumed that a localization system is installed, e.g., a beacon based localization system. For example, the beacons may be installed in luminaires and may double as servicing beacons when needed. Servicing device 200 may determine its position from these beacons.

The location of the building automation device is shown at 220 in a computer based servicing device. The computer based servicing device is exemplarily depicted as a servicing device software/app running on a tablet computer. Shown in FIG. 4 is the handheld computer device 200. The picture shown in the display is the building plan 210. Lighting devices 211 are shown and e.g. manual devices like switches 214. Around present location 220 a circle is shown that indicates the likely position of a building automation device that needs servicing. The radius of the circle is determined from the strength of the received localization signal. As servicing device 150 moves closer to the building automation device that sends the localization signal the radius of the circle decreases.

In a further developed embodiment additional Information about the requesting asset may be contained in an information note 221 which is displayed. The note may change depending on pointing actions on the screen, etc.

Typically, the devices 120 and 150 in FIGS. 1a-1f each comprise a microprocessor (not separately shown) which executes appropriate software stored at the device; for example, that software may have been downloaded and/or stored in a corresponding memory, e.g., a volatile memory such as RAM or a non-volatile memory such as Flash (not separately shown). Alternatively, these devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, both the servicing device 150 and the building automation device 120 each comprise a beacon and a beacon receiver. This allows both of the device to signal the approach of the other. For example, the servicing device can display a signal, and the building automation device can give a visual and/or audible signal.

Figure 5:
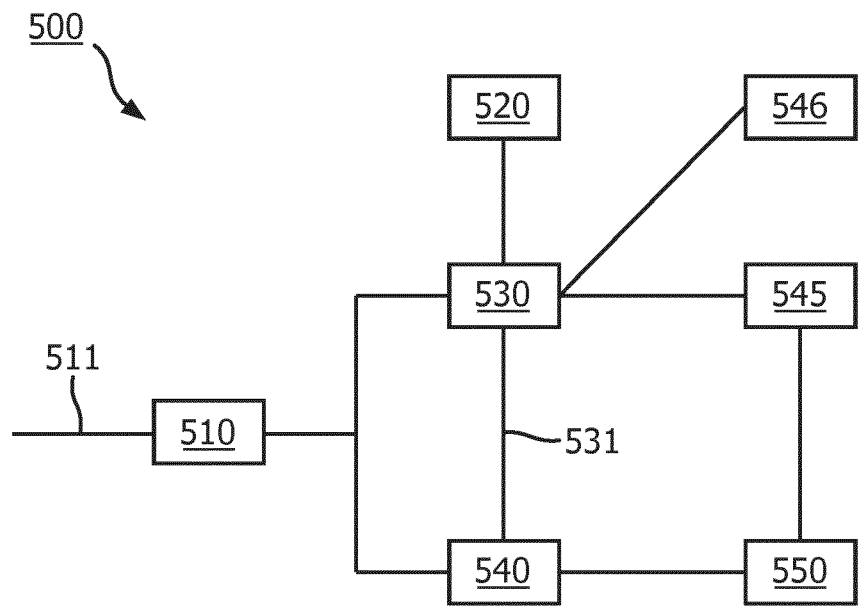

FIG. 5 schematically shows an example of an embodiment of building automation device, in this case a luminaire 500 in which a LED 550 is installed. Luminaire 500 is an example of a building automation device.

Luminaire 500 comprise a powered device circuit 510. Powered device circuit 510 is arranged for Power over Ethernet. Powered device circuit 510 obtains electric power to drive luminaire 500 from a power over Ethernet connection 511. Powered device circuitry 510 is further arranged to provide access to a digital network, that connects luminaire 500 to a control computer. For example, powered device circuit 510 (PD) may be interface circuitry configured to connect to a client; in this case to connect a luminaire to a PoE PSE. Powered device circuit 510 is optional and may be replaced, e.g., by a connection to an electricity source, such as the mains. For example, the powered device (PD) may optionally be used to send a service request to a control computer 130, e.g., as described in the context of FIG. 1e.

Luminaire 500 comprises a driver 540 driving a LED 550. Processor 530 controls driver 540 through a control connection 531. For example, processor 530 turns the LED on or off in dependence upon control signal received from a control computer, e.g., control computer 130.

Luminaire 500 comprises a memory 520 and a processor circuit 530. Processor circuit 530 executes computer instructions stored in memory 520. Luminaire 500 comprises a monitoring unit 546 arranged to monitor luminaire 500. For example, measurement unit 545 may be current monitor, voltage monitor or counter as described above. Luminaire 500 comprises a beacon receiver 546. If measurement unit 545 detects that LED 550 operates outside of predefined operating thresholds, then processor circuit 530 waits for beacon receiver 546 to receive a servicing localization signal from a servicing device 150 and starts to give a visual and/or audible signal.

In practice, it may happen that a defective building automation device is so far broken, that it cannot even give the signal. For example, if the LEDs are fully broken then the visual signaling may not work. However, in this case it will typically be clear which luminaires are broken, as they cease to function.

Figure 6:
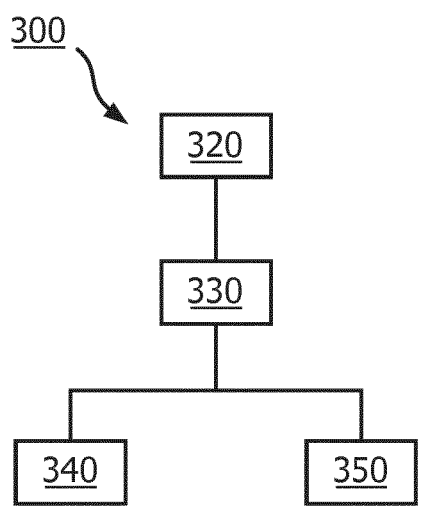

FIG. 6 schematically shows an example of an embodiment of a building automation method 300 for a building automation device. Method 300 comprises:

monitoring 320 the building automation device, by a building automation device, determining 330 a need for servicing of the building automation device, by a building automation device, and at least one of, transmitting 340 a localizing beacon signal by a servicing beacon, receiving 350 a localizing beacon signal by a beacon receiver 124 transmitted from a servicing beacon, the transmitting and receiving of the localizing beacon signal.

As described above, a building automation device may at least one of the transmitting and receiving.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
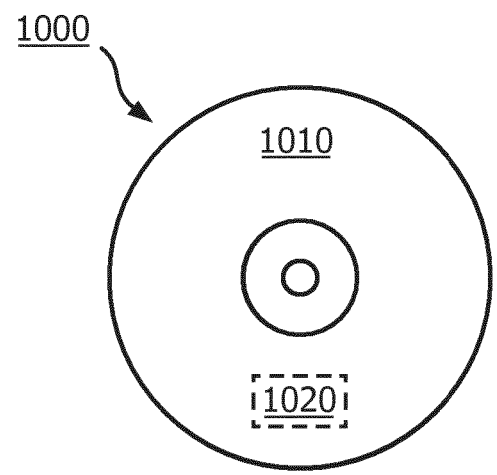

FIG. 7a shows a computer readable medium 1000 having a writable part 1010 comprising a computer program 1020, the computer program 1020 comprising instructions for causing a processor system to perform a method for a building automation device, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method for a building automation device.

Figure 7B:
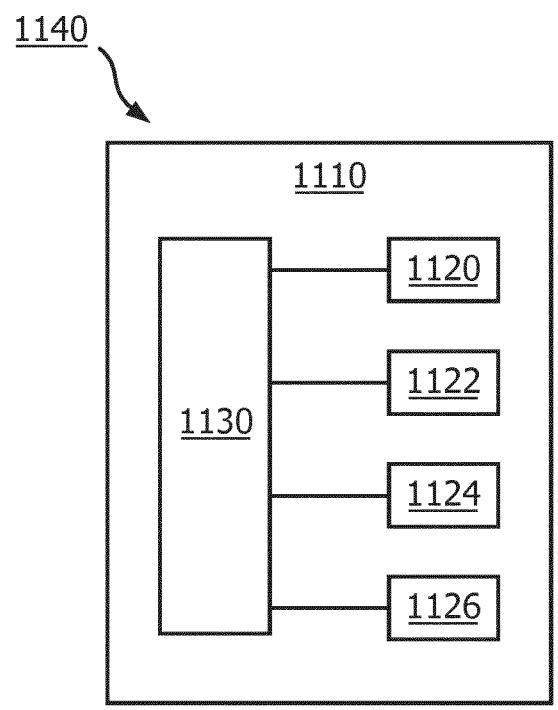

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the building automation device and/or the servicing device may comprise a processor circuit and a memory circuit, the processor being arranged to execute software stored in the memory circuit. For example, the processor circuit may be an Intel Core i7 processor, ARM Cortex-R8, etc. The processor circuit may also be lighter weight processor, e.g., an ARM Cortex-M0 processor.

The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software. In an embodiment, the servicing device may be a mobile computer, e.g., a phone or a tablet, etc., that is configured as a servicing device by downloading corresponding software on the mobile computer. For example, the software may be downloaded, e.g., over a computer network such as the Internet, from a software repository such as Google Play, etc. For example, the downloaded software may configure the mobile computer to transmit a localizing signal from a servicing beacon, and/or to receive a localizing signal.

The following clauses are related to embodiments. Divisionals may be filed based on the clauses, possibly combined with other parts of the description.

Clause 1. An electronic building automation system (101), comprising:
(I) one or more electronic building automation devices (120), comprising
  a processor circuit (128) configured to
    monitor the building automation device,
    determine a need for servicing of the building automation device, and
(II) a servicing device (150) for locating a building automation device in need of servicing,
wherein one of a building automation device and the servicing device comprises:
  a servicing beacon (110) arranged to transmit a localizing beacon signal, and wherein the other of the building automation device and the servicing device comprises:
  a beacon receiver (124) arranged to receive a localizing beacon signal transmitted from a servicing beacon, the building automation device and servicing device being arranged for the building automation device to be locatable when in need of servicing.

Clause 2. An electronic building automation system as in clause 1, wherein
  the servicing device comprises the servicing beacon, the servicing device being a mobile servicing device, the localizing beacon signal comprising a servicing device identifier indicating the beacon as a servicing beacon of a servicing device,
  the building automation device (120) comprises the beacon receiver (124), the processor circuit (128) being configured to
    obtain the servicing device identifier from the received localizing beacon signal to determine that the localizing beacon signal originated from a servicing device, and activate a visual or audible signal if a need for servicing is determined and the localizing beacon signal is determined to originate from a servicing device.

Clause 3. An electronic building automation system as in clause 1, wherein the building automation device comprises the servicing beacon, the servicing beacon being selectively activatable by the processor circuit to request service, the localizing beacon signal comprising a servicing request identifier indicating the beacon as a building automation device in need of servicing, the processor circuit (128) being configured to activate the servicing beacon causing the localizing beacon signal to be transmitted if the building automation device determined a need for servicing, the servicing device comprising the beacon receiver, a processor circuit of the servicing device being configured to obtain the servicing request identifier from the received localizing beacon signal to determine that the localizing beacon signal originated from a building automation device in need of servicing, and if so to generate a signal indicating the presence of a building automation device in need of servicing.

Clause 4. An electronic building automation device (120), comprising:

a beacon receiver (124) arranged to receive a localizing beacon signal transmitted from a servicing beacon, a processor circuit (128) configured to monitor the building automation device, determine a need for servicing of the building automation device, obtain a servicing device identifier from the received localizing beacon signal to determine that the localizing beacon signal originated from a servicing device, and activate a visual or audible signal if a need for servicing is determined and the localizing beacon signal is determined to originate from a servicing device.

Clause 5. An electronic building automation device (120), comprising:

a processor circuit (128) configured to monitor the building automation device, and determine a need for servicing of the building automation device, and a servicing beacon arranged to transmit a localizing beacon signal, the servicing beacon being selectively activatable by the processor circuit, the localizing beacon signal comprising a servicing request identifier indicating the servicing beacon as a building automation device in need of servicing, wherein the processor circuit is further configured to activate the servicing beacon causing the localizing beacon signal to be transmitted if the building automation device determined a need for servicing.

Clause 6. An electronic building automation device as in clause 4 or 5, wherein the building automation device is a luminaire, or wherein the building automation device is any one of the following group: a heating device, a ventilation device, an air conditioning device, a speaker, an automated air valve, a fire detector, an occupancy sensor, a day light sensor, a wall switch.

Clause 7. An electronic building automation device as in any one of clauses 4-6, wherein the building automation device comprises a current measuring unit arranged to determine electric current flowing through a component of the building automation device, the processor circuit of the building automation device being configured to determine a need for servicing when the building automation device is in an on-state and current measured by the current measuring unit is below a threshold, and/or the building automation device comprises a voltage measuring unit arranged to determine electric voltage across a component of the building automation device, the processor circuit of the building automation device being configured to determine a need for servicing when the building automation device is in an on-state and a voltage measured by the voltage measuring unit is above a threshold, and/or the building automation device comprises a counter, the processor circuit of the building automation device being configured to increase the counter in dependence on use of the building automation device, and determine a need for servicing when the counter reaches a threshold.

Clause 8. An electronic building automation device as in clause 5, wherein a servicing beacon is configured to have a first mode in which the servicing beacon transmits a first localizing beacon signal, the first localizing beacon signal not comprising the servicing request identifier, the servicing beacon in the first mode being part of a localization beacon network, and a second mode in which the in which the servicing beacon transmits a second localizing beacon signal, the second localizing beacon signal comprising the servicing request identifier indicating the beacon as a building automation device in need of servicing, the processor circuit (128) is configured to switch the servicing beacon from the first mode to second mode if the building automation device determined a need for servicing.

Clause 9. A servicing device for locating a building automation device in need of servicing, the servicing device being arranged to work with one or more building automation devices according to clause 4, the servicing device comprising a servicing beacon, the servicing beacon being arranged to transmit a localizing beacon signal, the localizing beacon signal comprising a servicing device identifier indicating the beacon as a servicing device beacon.

Clause 10. A servicing device for locating a building automation device in need of servicing, the servicing device being arranged to work with one or more building automation devices according to clause 5, the servicing device comprising:

beacon receiver (124) arranged to receive a localizing beacon signal transmitted from a servicing beacon, and a processor circuit configured to obtain a servicing request identifier from the received localizing beacon signal to determine that the localizing beacon signal originated from a building automation device in need of servicing, and if so to generate a signal indicating the presence of a building automation device in need of servicing.

Clause 11. A servicing device as in clause 10, comprising a communication interface (122) arranged to communicate with an external control computer over a digital network, the processor circuit being arranged to send a servicing request to the external computer if it has determined a building automation device in need of servicing.

Clause 12. A servicing device as in clause 11, wherein the servicing device is integrated with a shopping cart, moveable cleaning cart, or an autonomous cleaning robot.

Clause 13. An electronic method for a building automation device, the building automation system comprising one or more electronic building automation devices and a servicing device, the method comprising:

monitoring (320) the building automation device, determining (330) a need for servicing of the building automation device, and at least one of receiving (350) a localizing beacon signal by a beacon receiver (124) transmitted from a servicing beacon, obtaining the servicing device identifier from the received localizing beacon signal to determine that the localizing beacon signal originated from a servicing device, and activating a visual or audible signal if a need for servicing is determined and the localizing beacon signal is determined to originate from a servicing device, and activating a servicing beacon if a need for servicing is determined, and transmitting (340) a localizing beacon signal by the servicing beacon, the localizing beacon signal comprising a servicing request identifier indicating the beacon as a building automation device in need of servicing.

Clause 14. An electronic method for a servicing device for locating a building automation device in need of servicing, the servicing device being arranged to work with one or more building automation devices according to clause 5, the method comprising:

receive a localizing beacon signal transmitted from a servicing beacon, and obtain a servicing request identifier from the received localizing beacon signal to determine that the localizing beacon signal originated from a building automation device in need of servicing, and if so to generate a signal indicating the presence of a building automation device in need of servicing.

Clause 15. A computer readable medium (1000) comprising transitory or non-transitory data (1020) representing instructions to cause a processor system to perform the method according to clause 13 or 14.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic building automation device, comprising:
a processor circuit configured to
monitor the building automation device, and
determine a need for servicing of the building automation device, and
a servicing beacon arranged to transmit a localizing beacon signal, the servicing beacon being selectively activatable by the processor circuit, the localizing beacon signal comprising a servicing request identifier indicating the servicing beacon as a building automation device in need of servicing, wherein the servicing beacon is configured to have a first mode in which the servicing beacon transmits a first localizing beacon signal, the first localizing beacon signal not comprising the servicing request identifier, the servicing beacon in the first mode being part of a localization beacon network, and a second mode in which the servicing beacon transmits a second localizing beacon signal, the second localizing beacon signal comprising the servicing request identifier indicating the servicing beacon as a building automation device in need of servicing,
wherein the processor circuit is further configured to
switch the servicing beacon from the first mode to second mode if the building automation device determined a need for servicing.

2. An electronic building automation device as in claim 1, wherein the building automation device is a luminaire, or wherein the building automation device is any one of the following group: a heating device, a ventilation device, an air conditioning device, a speaker, an automated air valve, a fire detector, an occupancy sensor, a day light sensor, a wall switch.

3. An electronic building automation device as in claim 1, wherein
the building automation device comprises a current measuring unit arranged to determine electric current flowing through a component of the building automation device, the processor circuit of the building automation device being configured to determine a need for servicing when the building automation device is in an on-state and current measured by the current measuring unit is below a threshold, and/or
the building automation device comprises a voltage measuring unit arranged to determine electric voltage across a component of the building automation device, the processor circuit of the building automation device being configured to determine a need for servicing when the building automation device is in an on-state and a voltage measured by the voltage measuring unit is above a threshold, and/or
the building automation device comprises a counter, the processor circuit of the building automation device being configured to increase the counter in dependence on use of the building automation device, and determine a need for servicing when the counter reaches a threshold.

4. An electronic building automation device as in claim 1, wherein
the first and second localization signal comprises a constant preamble followed by a beacon identifier, the beacon identifier identifying the building automation device, and/or
the first and second localization signal comprises a signal power value indicating the transmission power of the beacon, and/or
the first and second localization signal is repeated each time period, said time period may be between, e.g., 100 ms and 1 second.

5. An electronic building automation device as in claim 1, comprising:
a beacon receiver arranged to receive a localizing beacon signal transmitted from a servicing beacon,
the processor circuit being configured to
obtain a servicing device identifier from the received localizing beacon signal to determine that the localizing beacon signal originated from a servicing device, and activate a visual or audible signal if a need for servicing is determined and the localizing beacon signal is determined to originate from a servicing device.

6. A servicing device for locating a building automation device in need of servicing, the servicing device being arranged to work with one or more building automation devices according to claim 1, the servicing device comprising:
a beacon receiver arranged to receive a localizing beacon signal transmitted from a servicing beacon, and
a processor circuit configured to
obtain a servicing request identifier from the received localizing beacon signal to determine that the localizing beacon signal originated from a building automation device in need of servicing and estimate the distance to the building automation device from the received signal strength, and if the localizing beacon signal originated from a building automation device in need of servicing, to generate a signal indicating the presence of a building automation device in need of servicing, including the distance in the signal.

7. A servicing device as in claim 6, comprising a communication interface arranged to communicate with an external control computer over a digital network, the processor circuit being arranged to send a servicing request to the external computer if it has determined a building automation device in need of servicing.

8. A servicing device as in claim 7, wherein the servicing device is integrated with a shopping cart, moveable cleaning cart, or an autonomous cleaning robot.

9. A servicing device as in claim 6, the servicing device comprising a servicing beacon, the servicing beacon being arranged to transmit a localizing beacon signal, the localizing beacon signal comprising a servicing device identifier indicating the beacon as a servicing device beacon.

10. An electronic building automation system, comprising: one or more electronic building automation devices, as in claim 1, and a servicing device for locating a building automation device in need of servicing.

11. An electronic method for a building automation device, of a building automation system comprising one or more electronic building automation devices and a servicing device, the method comprising:
monitoring the building automation device,
determining a need for servicing of the building automation device, and at least one of
switching a servicing beacon from a first mode to a second mode if a building automation device determined a need for servicing, wherein the servicing beacon is configured to have a first mode in which the servicing beacon transmits a first localizing beacon signal, the first localizing beacon signal not comprising a servicing request identifier, the servicing beacon in the first mode being part of a localization beacon network, and a second mode which the servicing beacon transmits a second localizing beacon signal, the second localizing beacon signal comprising the servicing request identifier indicating the servicing beacon as a building automation device in need of servicing, the second localizing beacon signal comprising a servicing request identifier indicating the beacon as a building automation device in need of servicing.

12. An electronic method for a servicing device for locating a building automation device in need of servicing, the servicing device being arranged to work with one or more building automation devices according to claim 1, the method comprising:
receive a localizing beacon signal transmitted from a servicing beacon, and
obtain a servicing request identifier from the received localizing beacon signal to determine that the localizing beacon signal originated from a building automation device in need of servicing and estimate the distance to the building automation device from the received signal strength, and if the localizing beacon signal originated from a building automation device in need of servicing, to generate a signal indicating the presence of a building automation device in need of servicing, including the distance in the signal.

13. A non-transitory computer readable medium comprising data representing instructions to cause a processor system to perform steps for a building automation device of a building automation system comprising one or more electronic building automation devices and a servicing device, the steps comprising:
monitoring the building automation device,
determining a need for servicing of the building automation device, and at least one of
switching a servicing beacon from a first mode to a second mode if a building automation device determined a need for servicing, wherein the servicing beacon is configured to have a first mode in which the servicing beacon transmits a first localizing beacon signal, the first localizing beacon signal not comprising a servicing request identifier, the servicing beacon in the first mode being part of a localization beacon network, and a second mode which the servicing beacon transmits a second localizing beacon signal, the second localizing beacon signal comprising the servicing request identifier indicating the servicing beacon as a building automation device in need of servicing, the second localizing beacon signal comprising a servicing request identifier indicating the beacon as a building automation device in need of servicing.

* * * * *